United States Patent [19]

Beecher

[11] 3,918,792

[45] Nov. 11, 1975

[54] BINOCULAR WITH FOCUSING MECHANISM

[76] Inventor: William J. Beecher, 1960 Lincoln Park West, Chicago, Ill. 60614

[22] Filed: May 13, 1974

[21] Appl. No.: 469,400

Related U.S. Application Data

[62] Division of Ser. No. 312,022, Dec. 4, 1972.

[52] U.S. Cl. .................................... 350/76; 350/36
[51] Int. Cl.² ........................................... G02B 7/06
[58] Field of Search ....................... 350/36, 76, 77

[56] References Cited
UNITED STATES PATENTS

| 2,602,371 | 7/1952 | Harford | 350/76 |
| 2,988,955 | 6/1961 | Goto et al. | 350/75 |

FOREIGN PATENTS OR APPLICATIONS

| 973,186 | 9/1950 | France | 350/76 |
| 269,445 | 1/1914 | Germany | 350/76 |
| 441,549 | 11/1948 | Italy | 350/76 |

*Primary Examiner*—David H. Rubin
*Attorney, Agent, or Firm*—Norman H. Gerlach

[57] ABSTRACT

A high performance binocular embodying a novel focusing mechanism which selectively accommodates both center focusing and individual focusing of the two telescopes of the binocular.

2 Claims, 24 Drawing Figures

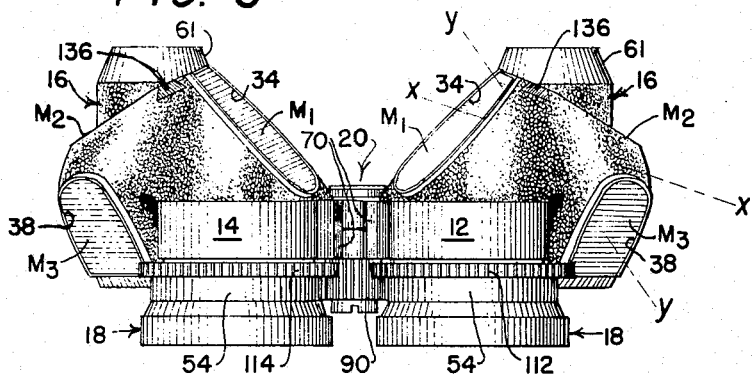
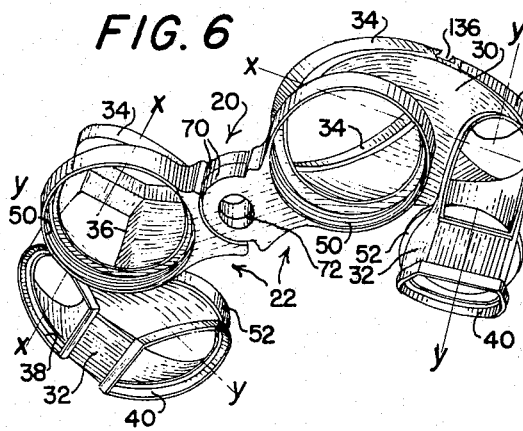
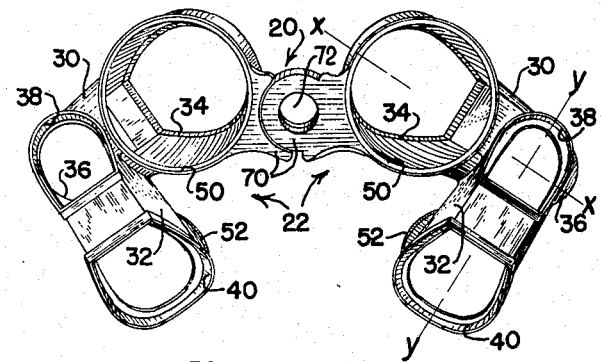
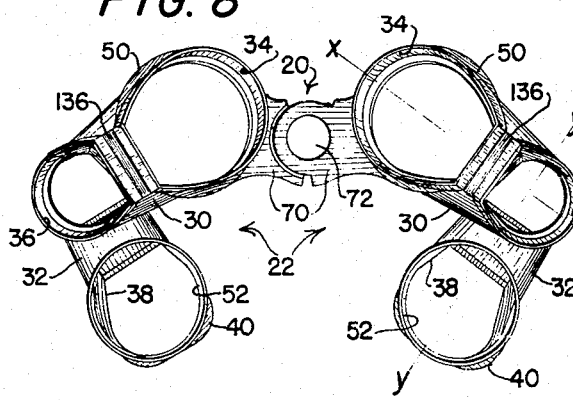
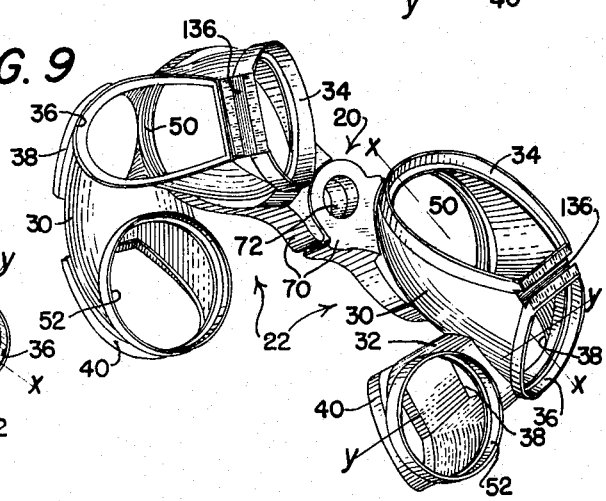

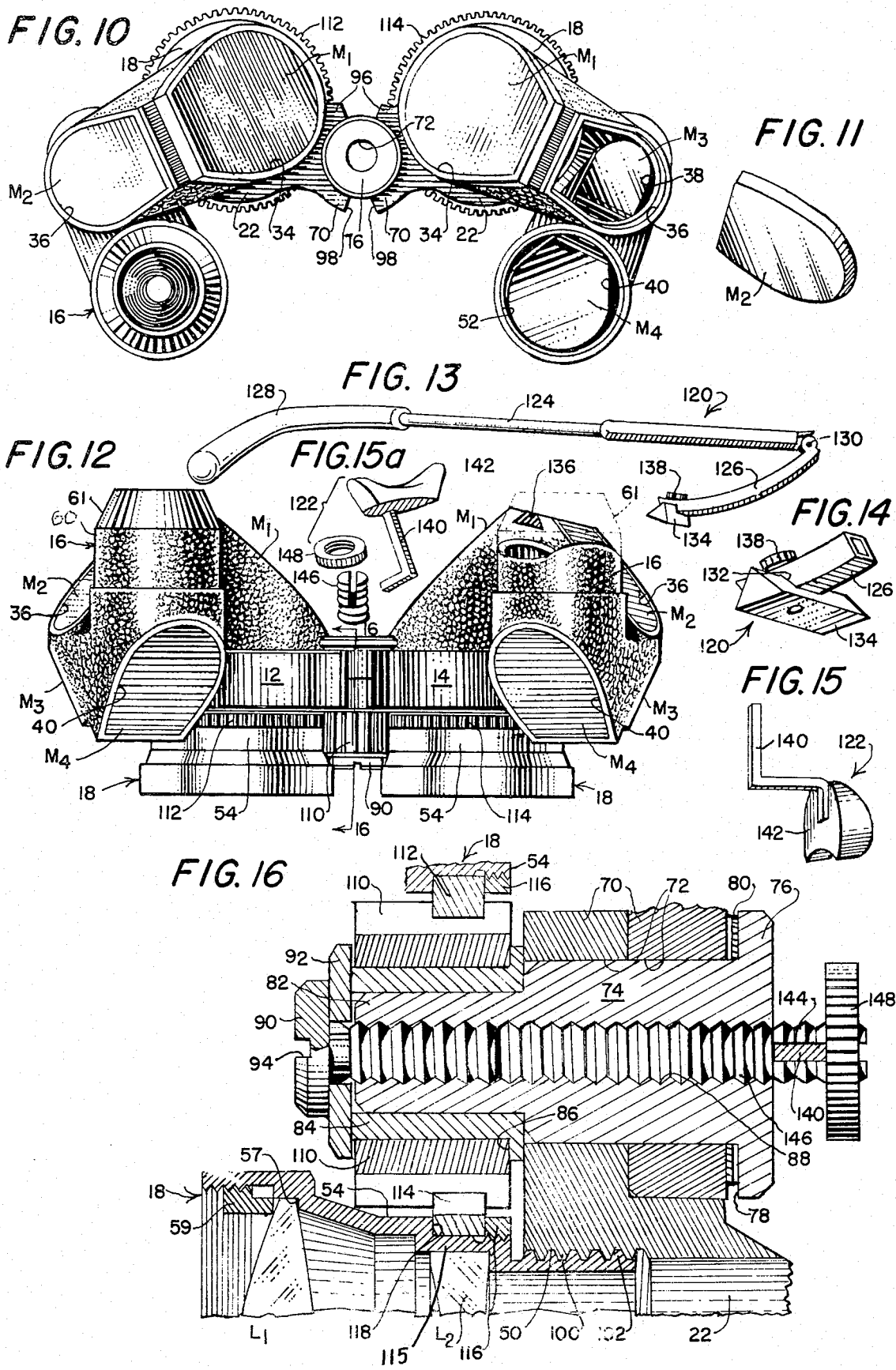

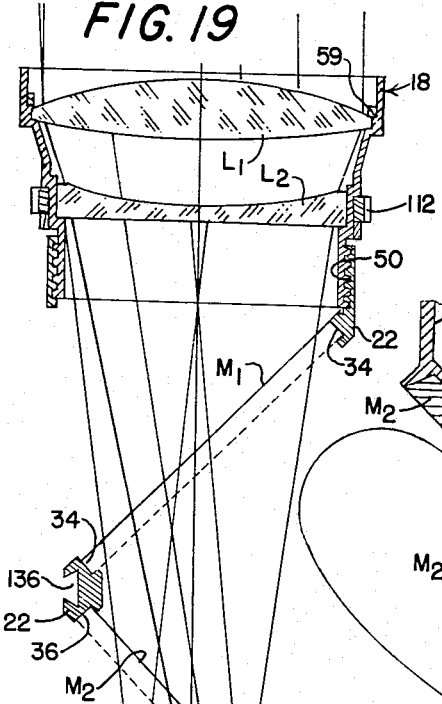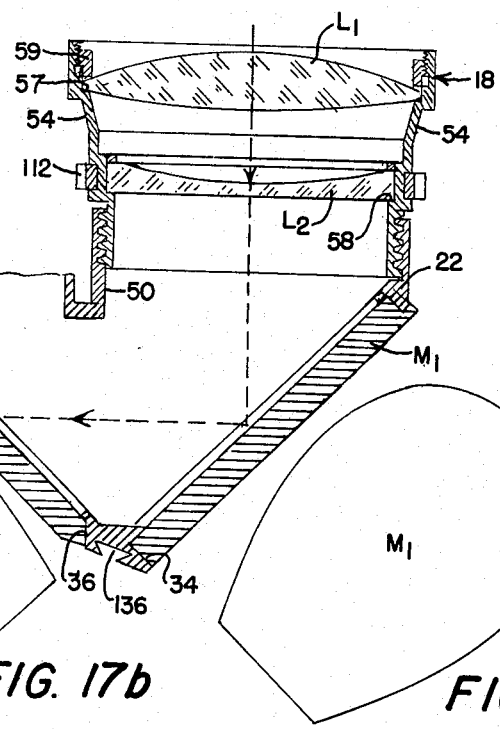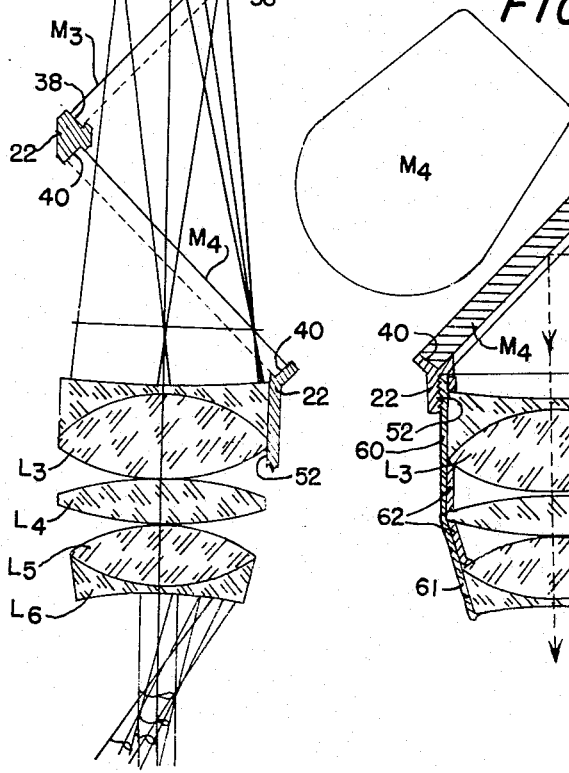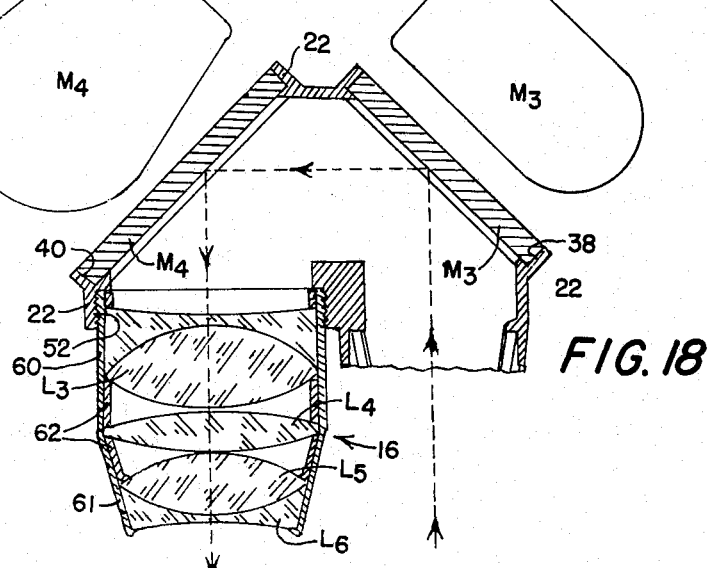

BINOCULAR WITH FOCUSING MECHANISM

This application is a division of applicant's copending patent application Ser. No. 312,022, filed on Dec. 4, 1972 and entitled "BINOCULAR HAVING SMALL SIZE, LIGHTWEIGHT, AND HIGH PERFORMANCE CHARACTERISTICS."

The present invention relates generally to optical instruments and has particular reference to a binocular of the type which embodies two telescopes in that it has the usual eyepiece and objective barrels together with an erecting system.

The object of the invention is the provision in connection with a binocular of the aforementioned type of novel focusing mechanism by means of which either center focusing of the binocular halves or individual focusing thereof, each to the exclusion of the other, may be selectively performed.

The aforementioned novel focusing mechanism of the present invention obviates many of the difficulties which are encountered in connection with the central focusing mechanisms of conventional binoculars, particularly those which employ sliding telescopic barrel-to-frame parts under the control of either rack and pinion or worm and screw arrangements. Such focusing mechanisms are either difficult to seal against ingress of moisture or they are easily damaged when the instruments in which they are employed are subjected to moderate impact. Furthermore, such central focusing mechanisms of conventional binoculars invariably make provision for the individual focusing adjustment of at least one of the two binocular halves and the focusing procedure which is employed in first correlating the focusing adjustments of both halves of the binocular so that subsequent center focusing will retain such correlated adjustments is sufficiently involved that operational difficulties are encountered, particularly by an inexperienced user of the instrument. The focusing adjustment of the present binocular obviates all of these limitations by providing a means whereby corresponding barrels, preferably the objective barrels, of the binocular are individually adjustable on the basis of mating threads on the barrel and shell. To provide for center focusing of the binocular, the two barrels are frictionally driven in unison and in the same direction by a slip connection so that upon manual rotation of either barrel, the other barrel will be rotated commensurately. By such an arrangement, and as will be described in greater detail presently, the usual initial focusing of one half of the binocular on a given object may be attained by rotating either barrel, after which correlated focusing of the other half of the binocular on the selected object may be made by manually restraining the one half while manually rotating the other half until focusing correlation is attained. Thereafter, release of such other half will leave the binocular halves in proper correlated focusing adjustment.

Additional ancillary features of the present binocular, such as the provision of a means for regulating the degree of friction which obtains in the aforementioned slip connection between the two rotatable barrels for convenient manipulation during focusing adjustments, the ease and rapidity with which the associated earpiece and nosepiece assemblies may be applied to and removed from the shell of the instrument, and the novel cooperation between the usual central hinge pin and the aforementioned slip connection between the barrels, constitute further features of novelty which will become readily apparent as the nature of the invention is better understood from a consideration of the following detailed description.

Other objects and advantages of the invention, not at this time numerated, will readily suggest themselves as the nature of the invention is better understood.

The invention consists in the several novel features which are hereinafter set forth and are more particularly defined by the claims at the conclusion hereof.

In the accompanying four sheets of drawings forming a part of this specification, one illustrative embodiment of the invention is illustrated in detail.

In these drawings:

FIG. 5 is a top plan view of the binocular;

FIG. 6 is a rear perspective view of the two-part basic and assembled articulated binocular shell, such view being viewed obliquely from above and for purposes of clarity being devoid of the lenses, mirrors and related parts which are normally mounted in the shell;

FIG. 7 is a direct rear perspective view of the binocular shell;

FIG. 8 is a direct front perspective view of the binocular shell;

FIG. 9 is a front perspective view of the binocular shell as viewed obliquely from below;

FIG. 10 is an enlarged front elevational view similar to FIG. 1 but with the right side mirror and eyepiece removed in order to reveal internal structure;

FIG. 11 is a perspective view of one of the horseshoe-shaped mirrors which are employed in connection with the invention;

FIG. 12 is an enlarged bottom plan view similar to FIG. 2 but with one eyepiece broken away;

FIG. 13 is a perspective view of one of the detachable earpiece assemblies which are employed in connection with the invention;

FIG. 14 is an enlarged fragmentary perspective view of one of the dovetail connections by means of which the earpiece assemblies are removably secured to the binocular shell;

FIG. 15 is an enlarged perspective view of the nosepiece assembly of the improved binocular constituting the present invention;

FIG. 15a is an exploded perspective view of the nosepiece assembly of FIG. 15 and its associated attachment means;

FIG. 16 is an enlarged vertical sectional view taken substantially along the line 16—16 of FIG. 12, the adjacent objective barrel being also in section;

Figure 4:
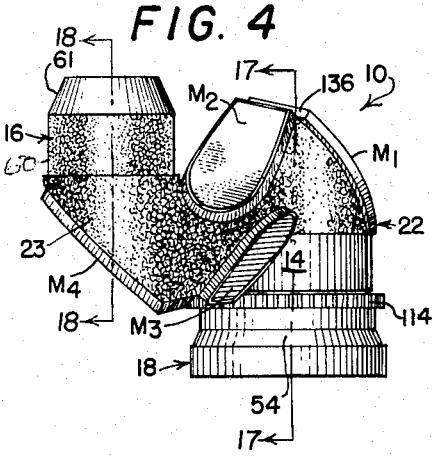
FIG. 4 is a right side elevational view of the binocular.

FIGS. 17 and 18 are positionally arranged sectional views which are largely schematic in their representation and are taken generally on the lines 17—17 and 18—18 respectively, of FIG. 4, the two views when considered collectively illustrating the central path of light through the binocular;

FIGS. 17a, 17b, 18a and 18b are face views of four mirrors which are employed in connection with the invention and which appear in FIGS. 17 and 18, the mirrors being positioned in the drawings alongside their respective mirror disclosures of FIGS. 17 and 18; and FIG. 19 is a developed longitudinal sectional-type diagram of the unfolded optical system of one telescope of the binocular and illustrating the manner in which bundles of light pass through such telescope.

Referring now to the drawings in detail and in particular to FIGS. 1 to 4, inclusive, these figures are drawn to full scale and illustrate generally the external configuration of a binocular embodying the principles of the present invention, such binocular being identified by the reference numeral 10. As is customary in connection with conventional binoculars of the type under consideration, the binocular 10 is comprised of two counterpart telescopes 12 and 14, the telescope 12 as viewed in FIG. 1 being designed for viewing cooperation with the user's left eye and the telescope 14 as viewed in FIG. 1 being designed for viewing cooperation with the user's right eye. In the following description, as well as in the appended claims, reference to the binocular 10 insofar as is practicable will be made on the basis of the position which it assumes in FIG. 1. So far as the present patent application is concerned, that part of the binocular which includes the eyepiece barrels 16 will be considered as the front of the binocular and that part which includes the objective barrels 18 will be considered as the rear of the binocular. In such figure, the binocular is shown in its horizontal viewing position with the two tubular eyepiece barrels 16 and the two objective barrels 18 extending horizontally and with the two eyepiece barrels disposed in a horizontal plane below the horizontal plane of the two objective barrels. Furthermore, since the two telescopes 12 and 14 are substantially identical except insofar as they are complementary structures and differ from each other only by the use of components which are "mirror complements," a description of one telescope will suffice largely for the other. The two telescopes 12 and 14 are connected together by a hinge connection 20 the nature of which will be made clear presently.

Each telescope involves in its general organization a series of four mirrors or reflectors M1, M2, M3 and M4, these mirrors being arranged in Porro-one fashion at mutual right angles and also supported in a unitary housing-forming shell 22 (see FIGS. 17, 17a, 17b, 18, 18a and 18b). Said shell serves fixedly to support the associated eyepiece barrel 16 and also rotatably to support the associated objective barrel 18. In addition, it forms a foundation for an external covering or skin 23. Generally speaking, each shell 22 is of frame-like design as shown in FIGS. 6 to 9 of the drawings.

The two frame-like shells 22 are connected together by the aforementioned hinge connection 20 and, when so connected, constitute the articulated binocular framework. Each shell is preferably formed of die cast magnesium although other suitable materials are contemplated and may be employed if desired.

The mirrors M1, M2, M3 and M4 are planar and in the exemplary form of the invention they are constructed of glass-laminated magnesium although it is within the purview of the invention to construct them entirely of glass or metal or a laminated combination thereof. Irrespective, however, of the particular material of which the mirrors are formed, the particular function of such mirrors is the same or always preserved. As will be described more in detail hereafter, the four aforementioned mirrors are generally horseshoe-shaped.

The geometry or specific configuration of the frame-like shells 22 is best illustrated in FIGS. 6 to 9, inclusive, where it will be observed that each shell, as previously indicated, is of unitary construction and embodies a lightweight magnesium or other metal or plastic framework which is of complex contour and presents or consists of two somewhat bulbous generally tubular and slightly tapered upper and lower shell portions 30 and 32 (see FIG. 6). Such shell portions extend at right angles to each other and intersect and communicate at adjacent ends. The axes of the shell portions 30 and 32 are shown in FIGS. 5 to 9 by the dotted lines $x-x$ and $y-y$, respectively. Generally speaking, the shell portions 30 and 32 of each shell 22 are nearly tangential at the region where they cross each other, there being a slight amount of intersection between these two hollow portions so that there is communication between them at their region of approximate tangency. The upper shell portions 30 are disposed in a substantially horizontal plane and extend from the binocular rear both outwardly and forwardly. The lower shell portions extend substantially vertically and extend downwards from the front outer ends of the upper shell portions.

Referring now to FIGS. 6 to 9, inclusive, it will be observed that the tubular shell portions 30 and 32 of each shell 22 are open at their ends and that the front portion of the inner end portion of the upper shell portion 30 is shaped to form a forwardly and inwardly facing flange-like horseshoe-shaped seating aperture 34 which has the mirror M1 mounted therein and has its axis extending at a 45° angle with respect to the longitudinal axis $x-x$ of said upper shell portion 30. The outer front end portion of the upper shell portion 30 terminates in a forwardly and outwardly facing flange-like horseshoe-shaped seating aperture 36 which has the mirror M2 mounted therein and has its axis at a 45° angle with respect to said axis $x-x$ of the upper shell portion 30. The upper end portion of the vertically extending lower shell portion 32 of each shell 22 terminates in an upwardly and rearwardly facing flange-like horseshoe-shaped, seating aperture 38 which has the mirror M3 mounted therein and has its axis at a 45° angle with respect to the axis $y-y$ of said lower shell portion 32. The lower end portion of said lower shell portion 32 is shaped to form a rearwardly and downwardly facing flange-like horseshoe-shaped, seating aperture 40 which has the mirror M4 mounted therein and has its axis at a 45° angle with respect to the vertically extending axis $y-y$ of said lower shell portion 32. As shown in the drawings, the mirror-seating apertures 34 and 36 are disposed in opposed relation and at right angles to one another, the mirror-seating apertures 36 and 38 are disposed in opposed relation and at a 45° angle with respect to one another, and the mirror-seating apertures 38 and 40 are disposed one over the other and at right angles to one another.

Still referring to the construction of the two frame-like shells 22 of FIGS. 6 to 9, inclusive, in conjunction with the binocular disclosure of FIG. 5, the aforementioned objective barrels 18 are rotatably and threadedly supported in circular apertures 50 which are formed in the rear inner end portions of the upper shell portions 30, face rearwards and are disposed in opposed relation with respect to the horseshoe-shaped seating apertures 34 for the mirrors M1. The axes of the circular apertures 50 extend at a 45° angle with respect to the mirrors M1 and at right angles to the axes x—x of the upper shell portions 30. The axes of the circular apertures 50 are also disposed in parallel relation with and close proximity to the hinge connection 20 as clearly shown in FIGS. 6 and 7. The eyepice barrels 16 of the binocular 10 are fixedly supported in circular apertures 52 which, as best shown in FIGS. 6, 8, 9 and 18 of the drawings, are formed in the lower end portions of the lower shell portions 32, face directly forwards and are disposed in opposed relation with respect to the mirrors M4 in the seating apertures 40. The axes of the circular apertures 52 extend at a 45° angle with respect to said mirrors M4 and at right angles to the longitudinally and vertically extending axis y—y of the lower shell portion 32.

Considering each frame-like shell 22 with its four mirrors M1, M2, M3 and M4 disposed in their respective seating apertures 34, 36, 38 and 40 and with its objective barrel 18 and eyepiece barrel 16 disposed in their respective circular apertures 50 and 52, light emanating from a distant source outside of the binocular 10 first enters the upper shell portion 30 via the objective barrel 18, then travels towards the front portion of the binocular and impinges against the mirror M1, then is deflected laterally and at right angles by the mirror M1 and travels outwardly through the upper shell portion 30, then impinges against the mirror M2 and is deflected at right angles by the latter so that it travels rearwards towards the mirror M3, then impinges against said mirror M3 and is deflected downwards through the lower shell portion 32, then strikes the mirror M4 and is deflected at right angles by the latter so that it travels forwards and lengthwise through the eyepiece barrel 16 in the circular aperture 52.

As previously stated, the longitudinally adjustable objective barrels 18 are fixedly mounted in their respective mounting apertures 50, the details of construction of the left-hand objective barrel being illustrated in FIG. 17. Such barrel, as well as the right-hand objective barrel of the binocular 10, is in the form of a self-contained lens holder assembly including a generally cylindrical rotatable tubular casing 54. The latter has an outer inside annular ledge support 57 for a double convex lens L1 and an inner inside annular ledge support 58 for a plano-concave lens L2, the two lenses being air-spaced from each other. The lens L1 is held in position by a retaining ring 59 which is threadedly received in the outer end of the casing 54 as shown in FIGS. 16 and 17, while the lens L2 may be bonded in position on the ledge support 58 by way of any suitable adhesive. The manner in which the objective barrels of the two telescopes 12 and 14 of the binocular 10 are capable of being rotated will be described in detail subsequently.

The eyepiece barrels 16 are fixedly mounted in their respective circular apertures 52 as previously pointed out. The left-hand eyepiece barrel is shown in detail in FIG. 18 and it, as well as the right-hand eyepiece barrel, is in the form of a self-contained lens holder assembly which includes a tubular casing 60 having a frusto-conical outer or front end 61. Said casing encloses a series of five lenses, namely, an inner achromat consisting of an outer double convex lens L3 in bonded relation with an inner double concave lens (not numbered), an intermediate double convex lens L4, and an outer achromat consisting of an inner convex lens L5 in bonded relation with an outer double concave lens L6. These lenses are serially arranged within the casing 60 successively in the order named. Spacer rings 62 serve to maintain the various lenses in their proper positions within the casing 60, the lens L6 having a frusto-conical outer surface which fits against the inside surface of the outer or front end of the casing 60.

The circular apertures 52 are interiorly threaded and the inner or rear ends of the casings 60 of the eyepiece barrels 16 are threadedly received within the apertures 52 with a tight fit which is intended to be permanent except for possible removal of the barrels 16 for lens replacement or cleaning purposes.

The specific character per se of the eyepiece barrels 16 and the objective barrels 18 constitute no part of the present invention as claimed except insofar as their cooperation with the various mirrors M1, M2, M3 and M4 is concerned. It is deemed sufficient for purposes of description herein to state that for the illustrated exemplary 8 × 30 mm., 8° binocular, ideal results are attained when the over-all focal length of the lenses in each eyepiece barrel 16 is on the order of 13.54 mm. and the focal length of the lenses in each objective barrel 18 is in the order of 101.88 mm., the eyepiece barrels presenting wide-angle characteristics on the order of 64°.

Referring again to FIGS. 1 to 5, inclusive, and additionally to FIGS. 10, 12 and 16, the two frame-like shells 22 of the binocular 10 are provided with cooperating and complementary hinge lugs 70 of similar construction, each hinge lug being formed integrally with and projecting inwards and laterally from the rear inner end region of the tubular upper shell portion 30 of the associated shell 22. The two hinge lugs 70 overlap each other as clearly shown in FIG. 6, and have formed therein coaxial holes 72 which receive therethrough a stepped hinge pin 74 (see FIG. 16) by means of which the two shells 22 are hingedly connected together. The rear end of the hinge pin 74 is provided with an integral outwardly extending annular flange 76 which defines a forwardly or inwardly facing annular shoulder 78. The latter opposes the rear side face of the adjacent hinge lug 70 and serves to prevent forward displacement of the hinge pin 74. A friction washer 80 of the undulatory or wavy type is interposed between the flange 76 and the opposed side face of the adjacent hinge lug 70 and functions in a manner and for a purpose that will be made clear presently.

The front end of the hinge pin 74 is in the form of a reduced extension 82 on which there is mounted a flanged bushing 84. The flange of such bushing is located at the inner end of the bushing and extends outwards. The front face of said flange defines a rearwardly facing shoulder 86, the purpose of which will be set forth hereafter. The hinge pin 74 and its extension 82 are provided with an axially extending coextensive threaded bore 88, the front end of which receives therein a clamping screw 90. The latter, when tightened in the bore 88, bears against a washer 92 so that the latter forces the busing 84 rearwardly (i.e., to the right as seen in FIG. 16) against the front side face of the adjacent hinge lug 70, thus compressing the friction washer 80 against the flange 76 and also urging and compressing the two hinge lugs tightly together. The clamping screw 90 is provided with a kerf 94 in order to facilitate turning thereof so that the degree of compression between the two hinge lugs may be varied at will. By such an arrangement, the pivotal or "bending" action between the two shells 22, and consequently, the two telescopes 12 and 14, may be regulated insofar as frictional resistance is concerned. It will be understood, of course, that this pivotal or bending action between the two binocular halves is provided for the purpose of adjusting the interpupillary distance between the eyepiece barrels 16. It will be further understood that the selected interpupillary distance will be frictionally retained as soon as the bending torque which is applied by the user in connection with binocular adjustment is relieved.

Figure 1:
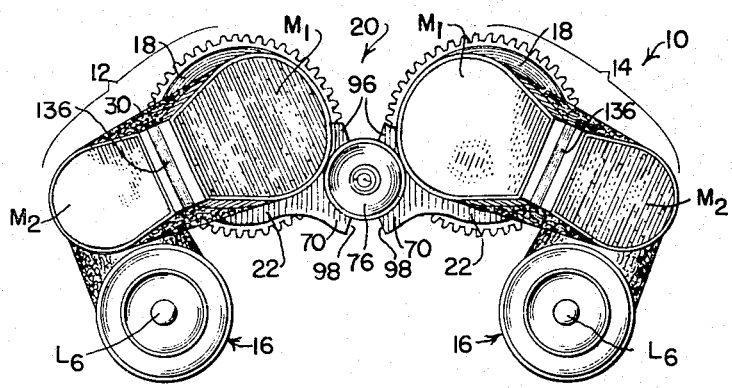
FIG. 1 is a front elevational view of a binocular embodying the principles of the present invention, such view illustrating the improved binocular in the operative viewing position in which it is held by the user.
Figure 2:
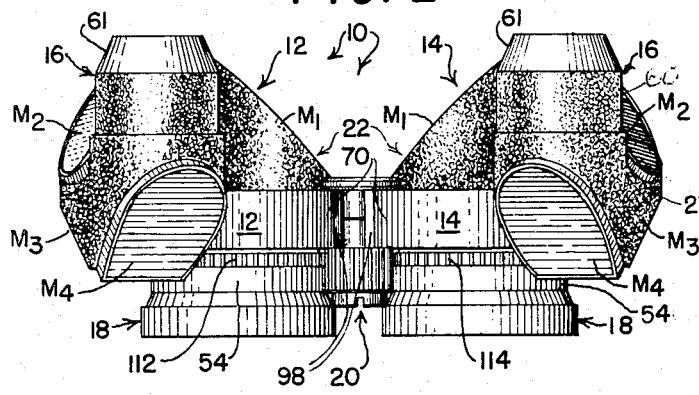
FIG. 2 is a bottom plan view of the binocular.
Figure 3:
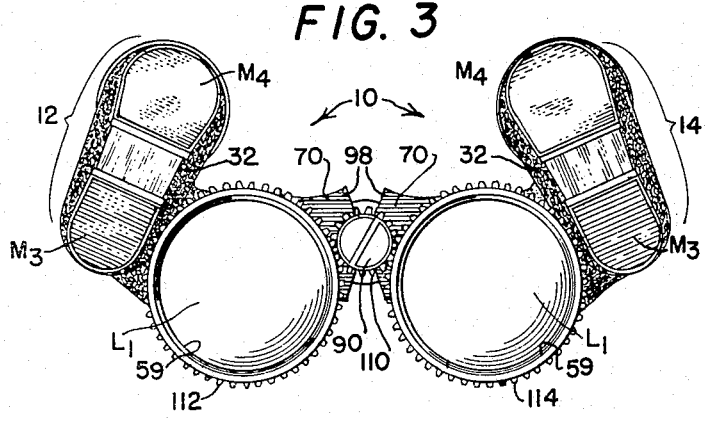
FIG. 3 is a rear elevational view of the binocular.

As best shown in FIGS. 1, 3 and 10, a pair of coacting upper stop shoulders 96 are formed on the two hinge lugs 70 and, when these shoulders move into abutting relationship in connection with pivotal adjustment of the two binocular halves, the maximum interpupillary distance of which the binocular is capable of assuming is attained. Similarly, a pair of coating lower stop shoulders 98 on the hinge lugs 70 determine the minimum interpupillary adjustment of the binocular 10.

According to the present invention, means are provided for effecting center focusing (simultaneous correlated focusing) of the two counterpart telescopes 12 and 14 of the binocular or alternatively effecting focusing of either telescope independently of the other telescope. Accordingly, and as best illustrated in FIG. 16, each aperture 50 is provided with a multiple start internal screw thread 100 and it is designed for threaded engagement with an external screw thread 102 on the casing 54 of the associated objective barrel 18. Simultaneous focusing of the two telescopes 12 and 14, i.e., center focusing of the binocular as a whole, is accomplished by rotating either objective barrel 18 as the case may be, the two objective barrels being frictionally geared to each other for rotational movement in unison by means of an idler pinion 110 which meshes with gears 112 and 114, the latter being concentrically mounted respectively on the casings 54 of the two objective barrels 18 with a sliding frictional fit in a manner that will be set forth presently. The idler pinion is rotatably mounted on the aforementioned flanged bushing 84 and is loosely confined against longitudinal or axial shifting between the flange of said bushing and the washer 92.

In order to place a moderate degree of frictional restraint on each of the two objective barrels 18, the gears 112 and 114 are in the form of gear rings which encompass the casings 54 of the barrels 18 and have annular series of external teeth. These gear rings are normally circumferentially rotatable and axially slidable on reduced cylindrical sections 115 of the casings 54 so that relative rotation between each gear ring and its associated objective barrel 18 is possible but a degree of frictional restraint is placed upon such relative motion by means of friction nuts 116 which are threadedly received on the casings 54 of the objective barrels 18, frictionally engage the rear side faces of the two gear rings, and force the latter forwardly against rearwardly facing annular shoulders 118 on said casings 54. By adjusting the compression of the friction nuts 116 against the two gear rings, the desired degree of friction at the side faces of the latter may be attained thus restraining relative circumferential sliding movement between the two gear rings and their respective casings 54.

From the above description, it will be apparent that because both gear rings (112 and 114) are in meshing engagement with the intermediate idler pinion 110, manual rotation of either objective barrel 18 will effect commensurate rotation of the other objective barrel in the same direction. Since these objective barrels are each threaded in their respective apertures 50, the degree of threaded advance or threaded retraction of the barrels in their respective apertures 50 will be precisely the same, regardless of which barrel is selected for manual turning movement. In this manner, center focusing of the binocular 10 is readily attained.

Individual focusing of either objective barrel 18 to the exclusion of the other objective barrel is attained by the simple expedient of manually restraining one barrel against rotation while rotating the other barrel. Obviously, the barrel which is restrained will remain stationary so that it will neither advance nor retract within its aperture 50. On the other hand, rotation of the other objective barrel will take place as soon as torque is applied thereto by reason of the fact that although the idler pinion 110 is held stationary due to its meshing engagement with the stationary gear ring on the stationary objective barrel, and although its gear ring is held stationary due to its meshing engagement with the stationary pinion 110, the casing 54 of the objective barrel being rotated may slip since it is only frictionally restrained by its associated friction nut 116 and shoulder 118 against which the associated gear ring slides. Thus, it may be independently focused.

The present binocular 10 is provided with an auxiliary attachment by means of which it may be converted from a hand-held optical instrument to a spectacle-type instrument. Such attachments consist of a pair of earpiece assemblies 120 (only one of which is disclosed herein) and a nosepiece assembly 122. One of the earpiece assemblies 120 is shown in detail in FIGS. 13 and 14, while the nosepiece assembly 122 is shown in detail in FIGS. 15, 15a and 16.

Considering now the illustrated earpiece assembly 120, this assembly involves in its general organization an articulated ear-engaging strut including a distal rod section 124 and a proximate section 126, the former section being provided with a conventional curved ear-encircling hook 128 and the latter section being in the form of an arcuate anchor piece which is connected by a hinge-type joint 130 to the rod section 124. The free end of the anchor piece 126 is provided with a V-shaped slot 132 in which is mounted transversely a generally triangular anchor bar 134, the latter being suitably held in position within the slot by silver solder or the like. As shown in FIGS. 1, 5, 6, 8, 12, and 17, the frame-like shells 22 of the two telescopes 12 and 14 are provided with elongated dovetail slots 136 on the front portions of the tubular upper shell portions 30 at regions between the apertures 34 and 36, such slots being designed for adjustable and removable reception therein of the triangular anchor bars 134 of the earpiece assemblies 120. Clamping screws 138 extend through both the anchor rods 126 and the triangular anchor bars 134 and, when tightened, serve to clamp the latter securely within their respective dovetail slots 136 in any desired adjusted position.

The nosepiece assembly 122 is in the form of a Z-shaped bar 140 which is square in cross section and to one end of which there is secured a nosepiece pad 142. The other end region of the bar 140 is designed for removable reception in the outer slotted end 144 (see FIGS. 15a and 16) of a retaining screw 146 which is threadedly received in the front end of the aforementioned bore 88 in the hinge pin 74 and, when so received, a knurled circular nut 148 may be screwed over said slotted end 144 of the screw 146 so as to clamp the bar 142 in a fixed and operative position on the hinge pin.

The two earpiece assemblies 120 and the single nosepiece assembly 122 are counterpart assemblies which conjointly serve to maintain the binocular 10 in a convenient viewing position in front of the eyes of the viewer with a major portion of the binocular being positioned at forehead level. In other words, whether the binocular is held in the hands of the viewer, or whether it is supported by the earpiece and nosepiece assemblies 120, 122, the eyepiece barrels 16 will assume positions directly in front of the eyes of the viewer while the objective barrels 18 will be disposed close to and immediately in front of the viewer's forehead. The binocular 10 is thus possessed of an appreciable periscopic function.

The particular optical system which is illustrated herein, when considered per se, constitutes no part of the present invention as previously indicated. The references which have heretofore been made to the system consist largely in a description of the general shape characteristics of the various lenses L1, L2, L3, L4, L5 and L6 and the placement of the mirrors M1, M2, M3 and M4 within specifically positioned mirror-receiving apertures in the binocular shells 22, together with a general description of the placement of the various mirrors and lenses with respect to one another.

The aforementioned optical system, when embodied in the binocular shells 22 and combined with the mirror erecting system which has been previously described herein, results in a high performance binocular having a longitudinally shorter optical system than has heretofore been considered possible with binoculars employing either mirrors or prisms for erecting purposes. For example, in the unfolded longitudinal sectional diagram of FIG. 19, it will be observed that the four mirrors M1, M2, M3 and M4 of each telescope of the binocular 10 are arranged in Porro-one relationship in their respective shell 22 and that the latter is constructed so that it exactly encloses the light path of the optical system. Furthermore, the various mirrors are positioned in close edge-to-edge relationship throughout the erecting system with only sufficient framework metal between adjacent mirror edges to provide the necessary mirror support. For example, as shown in FIGS. 17 and 19, the linearly straight edges of the horseshoe-shaped mirrors M1 and M2 are separated by the small thickness of framework metal which exists between the mirror-supporting apertures 34 and 36 and, as shown in FIGS. 18 and 19, the linearly straight edges of the horseshoe-shaped mirrors M3 and M4 are separated by the small thickness of framework metal which exists between the mirror-supporting apertures 38 and 40. Also as shown in FIGS. 6 and 19, the arcuate edges of the mirrors M2 and M3 are separated by a small thickness of metal which exists between the apertures 36 and 38.

Not only are the various mirrors M1, M2, M3 and M4 thus closely positioned, but as shown in FIGS. 17 and 19, the circular edges of the apertures 50 which receive the objective barrels 18 are positioned close to and in nearly tangential relationship with respect to the arched edges of the apertures 34 which receive the mirrors M1. Similarly, as shown in FIGS. 6 and 18, the circular edges of the apertures 52 which receive the eyepiece barrels 16 are positioned close to and in nearly tangential relationship with respect to the arched edges of the apertures 40 which receive the mirrors M4.

In the use of the herein described binocular 10, initial focusing of the instrument may be attained by a sighting procedure wherein the user, with the instrument held in a viewing position, closes either eye and sights a distant object with the other eye. By rotating the objective barrel 18 of the telescope which is thus being used for sighting purposes, this telescope may be brought into proper focus. During this procedure, rotation of the one objective barrel will serve to drive the other objective barrel simultaneously through the medium of the pinion 110 and the gears 112 and 114, thereby changing the focusing adjustment of the associated telescope. Since the latter telescope is not being used for sighting purposes, any out-of-focus condition of its optical system will offer no visual discomfort to the user (whose eye is closed) during this initial adjustment procedure. When the desired focusing adjustment of the one objective barrel is completed, any out-of-focus condition which obtains in the optical system which is associated with such other objective barrel may be remedied by holding the already focused objective barrel stationary and rotating the other objective barrel while sighting through the telescope having said other objective barrel, to the exclusion of the first and initially focused telescope, until both telescopes are correlated insofar as their focusing adjustments are concerned. In carrying out this focusing procedure, it is not essential that the user shall initially rotate the particular objective barrel which he or she is using for this initial sighting phase of binocular adjustment. The user, if he or she finds it more convenient, may rotate the objective barrel 18 which is not being used for initial sighting purposes since rotation of either objective barrel 18 will drivingly effect commensurate rotation of the other objective barrel. During that phase of the focusing procedure wherein one objective barrel is held stationary while the other objective barrel is rotated, the gear ring 112 or 114 (as the case may be) which encompasses the stationary objective barrel, will slip within the groove which is defined for it by the associated shoulder 118 and the friction nut 116. It is contemplated that during assembly of the binocular 10 at the factory, the friction nuts 116 will be adjusted for an optimum condition of friction and then permanently bonded in their adjusted positions. After both telescopes 12 and 14 of the binocular have been correlated with the respective refractions of both eyes of the user, focusing of both telescopies for the viewing of objects near or far may be effected by simply rotating either objective barrel 18 with the assurance that the other barrel will be commensurately rotated.

It is to be noted that during rotation of either objective barrel 18 to the exclusion of the other barrel, the consequent axial displacement of the rotated barrel with respect to the other or stationary barrel will cause the associated gear ring 112 or 114 (as the case may be) to slide on the pinion 110 so that there will be no danger of mis-mating of gears or gear separation. Thus, regardless of the particular longitudinal positions of the two objective barrels 18, a frictional driving relationship will at all times obtain between these barrels.

It is to be further noted that when the binocular 10 is in use, regardless of whether the same be hand-held or worn by means of the eyepiece and nosepiece assemblies 120 and 122, only the eyepiece barrels 16 are in front of the eyes and these are of extremely small size despite the use of lens elements of the wide angle Erfle type. The various mirrors M1, M2, M3 and M4 so fold the optical system as to place the relatively bulky objective barrels 18 out of sight of the viewer annd immediately in front of the forehead in close proximity to the latter. Thus, only the relatively small-diameter eyepiece barrels 16 are in front of the eyes and such barrels are of the smallest size possible consistent with any eyepiece having an angular field of the order of 64°. The first lenses L6 of the eyepiece barrels 16 are mounted at the apices or small bases of the frusto-conical outer or front ends 61 of the casings 54 of the eyepiece barrels with only an extremely thin aperture rim. Thus, the user's eyes see both through the instrument, as well as around it, thereby creating what may be termed a bifocal effect without the dark or opaque framing circle which is common to conventional or standard binoculars. By reason of the aforementioned frusto-conical outer or front ends of the eyepiece barrels 16, clearance is provided for direct visual sighting beneath the binocular 10 when the user tilts his or her head upwardly a few degrees.

The invention is not to be limited to the exact arrangement of parts shown in the accompanying drawings or described in this specification as various changes in the details of construction may be resorted to without departing from the spirit or scope of the invention. For example, although the invention has specifically been illustrated and described herein in connection with a binocular, it is within the scope of the present invention to embody the principles and structural features thereof in other optical instruments as, for example, in a telescope or other monocular instrument. Therefore, only insofar as the invention is particularly pointed out in the accompanying claims is the same to be limited.

Having thus described the invention what I claim as new and desire to secure by Letters Patent is:

1. A binocular comprising a pair of telescopes, a hinge pin hingedly connecting said telescopes together for swinging movement toward and away from each other for inter-pupillary adjustment, each telescope including a shell presenting a forward upper objective aperture and a rear lower eyepiece aperture, the planes of said apertures extending in parallelism, a lens-containing eyepiece fixedly mounted in said eyepiece aperture, said objective aperture being provided with an internally threaded rim, a tubular lens-containing objective barrel having a rear threaded section threadedly received in said rim for focusing adjustment upon rotation of the barrel in either direction, an optical erecting system disposed within said shell and effective between said eyepiece and objective barrel, said barrel having a second threaded section forwardly of the rear threaded section, and an adjacent reduced cylindrical section terminating in an annular radial shoulder, a gear ring encompassing said cylindrical section and normally being freely rotatable and axially slidable thereon, a pinion rotatably mounted on said hinge pin and meshing with the gear rings of each telescope whereby rotation of either gear ring will induce rotation of the other gear ring, and a friction nut threadedly received on said second threaded section and effective when partially tightened against the adjacent gear ring to clamp said latter gear ring against the shoulder with varying degrees of friction whereby individual focusing of the lens-containing barrels may be attained by restraining rotation of either objective barrel while forcibly rotating the other objective barrel.

2. A binocular as set forth in claim 1 and wherein said second threaded section on the barrel is disposed immediately forwardly of the first threaded section, the reduced cylindrical section of the barrel is disposed immediately forwardly of the second threaded section, and the annular radial shoulder faces rearwardly and is disposed at the forward end of said second threaded section whereby partial tightening of the friction nut serves to force the forward end of the gear ring against said annular radial shoulder.

* * * * *